United States Patent [19]
Dinsdale

[11] Patent Number: 6,117,575
[45] Date of Patent: Sep. 12, 2000

[54] BATTERY COMPARTMENT

[75] Inventor: Michael C. Dinsdale, Richardson, Tex.

[73] Assignee: AMEI Technologies, Inc., Wilmington, Del.

[21] Appl. No.: 08/846,649

[22] Filed: May 1, 1997

Related U.S. Application Data

[60] Provisional application No. 60/040,291, Feb. 12, 1997.

[51] Int. Cl.[7] .............................. H01M 2/34; H01M 2/10
[52] U.S. Cl. ................................. 429/1; 429/96; 429/100
[58] Field of Search ................... 429/1, 100, 96

[56] References Cited

U.S. PATENT DOCUMENTS

| | | | |
|---|---|---|---|
| 3,855,534 | 12/1974 | Holcomb et al. | 325/118 |
| 3,969,148 | 7/1976 | Trattner | 136/173 |
| 4,129,688 | 12/1978 | Fischer et al. | 429/97 |
| 4,138,531 | 2/1979 | Thompson | 429/98 |
| 5,413,499 | 5/1995 | Wright, Jr. et al. | 439/500 |

*Primary Examiner*—John S. Maples
*Attorney, Agent, or Firm*—Baker Botts, L.L.P.

[57] ABSTRACT

A battery contact and holding apparatus (10, 200) includes a door (12, 212) and a battery compartment 14, 214) associated with the door. The door selectively provides access to the interior (16, 216) of the battery compartment. The apparatus also includes a plurality of contacts (86,88, 286,288) for electrically coupling to a battery (64, 264) in the battery compartment and a post locator (56, 256) associated with the battery compartment for aligning one or more posts (62,66, 262,266) of a battery with one or more of the plurality of contacts and for disallowing the door to close off the interior of the battery compartment if a battery is not properly placed.

17 Claims, 3 Drawing Sheets

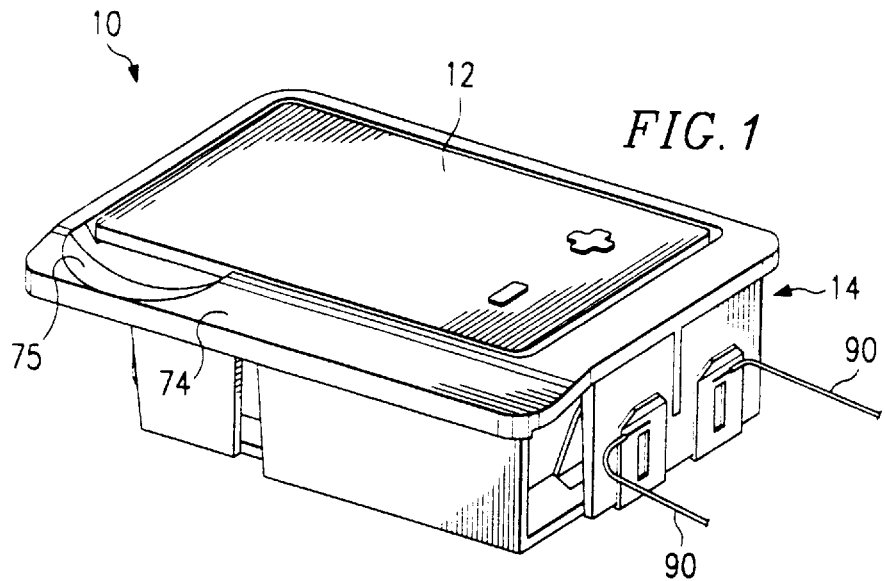
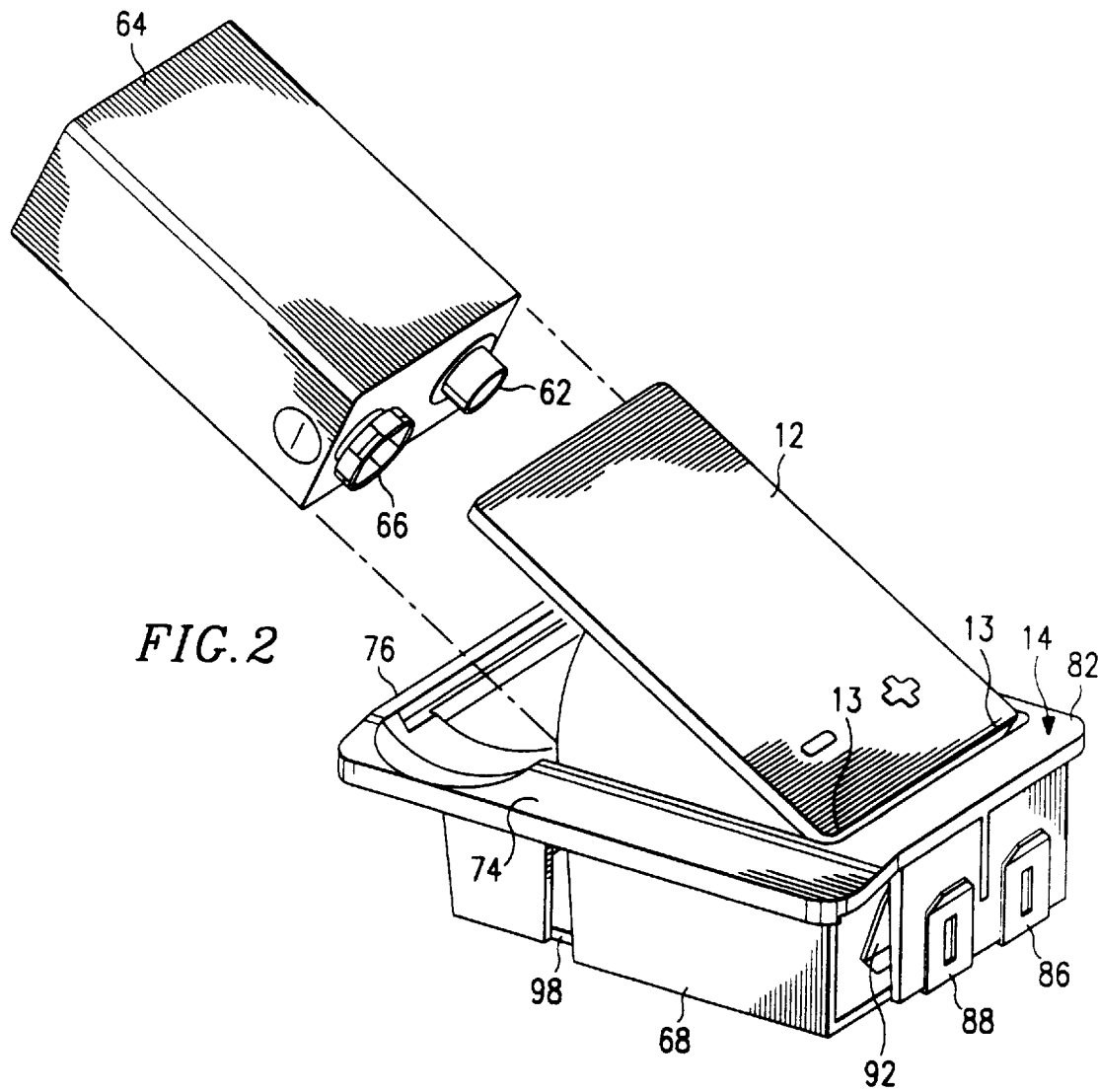

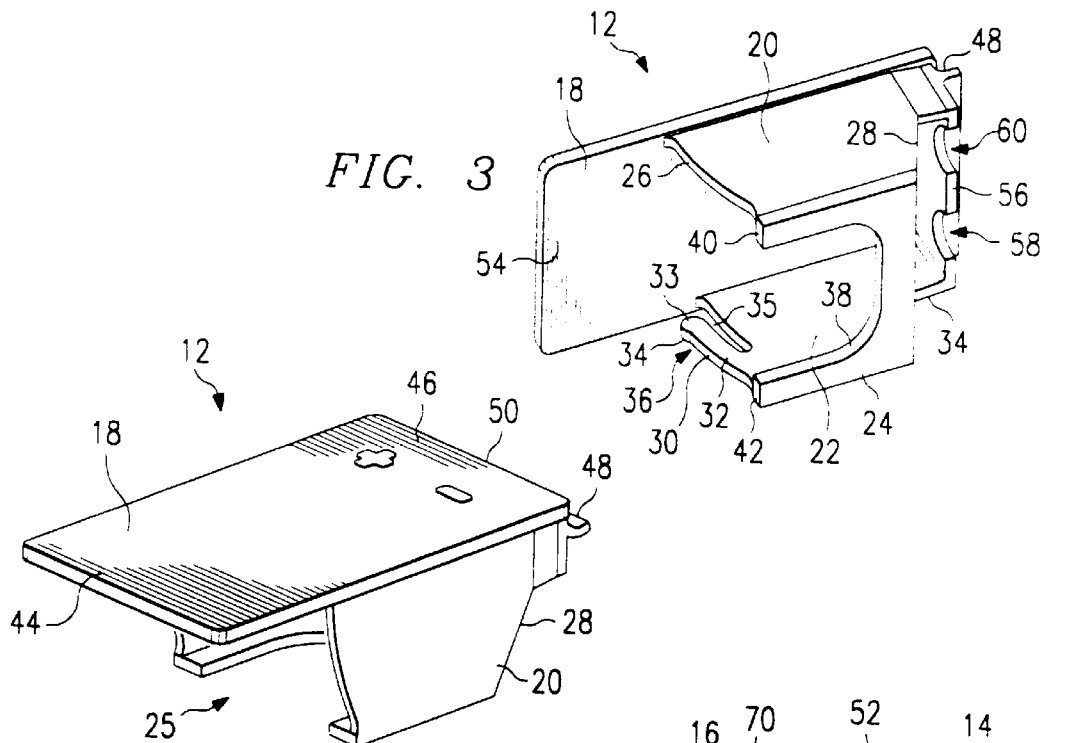
FIG. 3
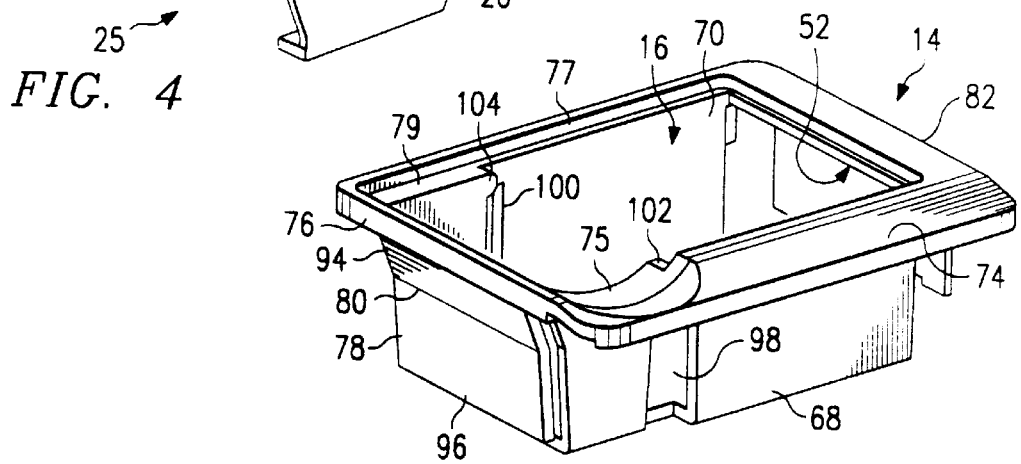
FIG. 4
FIG. 5
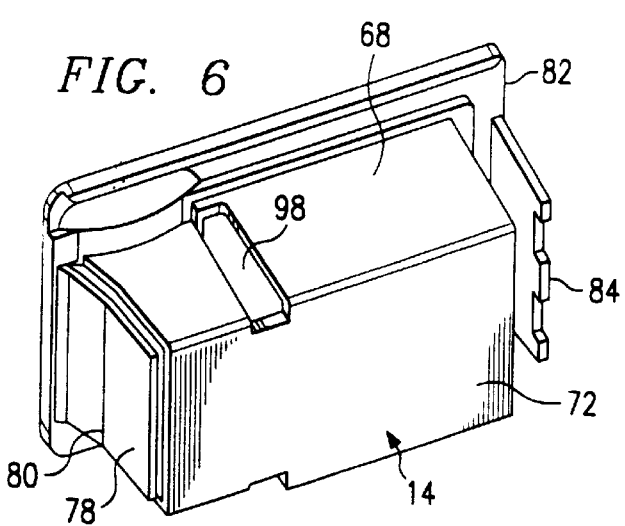
FIG. 6

BATTERY COMPARTMENT

RELATED APPLICATIONS

This application claims the benefit of U.S. Provisional Patent Application Ser. No. 60/040,291, filed Feb. 12, 1997.

TECHNICAL FIELD OF THE INVENTION

The invention is related to batteries and more particularly to battery compartments.

BACKGROUND OF THE INVENTION

Electronic devices such as electronic games, calculators, radios, and many other devices both simplify life as well as make it more enjoyable. Many electronic devices frequently require a self-contained power source in the form of a battery or a number of batteries. The battery or batteries will typically require replacement from time to time.

For some, replacement of batteries may reduce the enjoyment provided by these electronic devices. In some conventional electronic devices, it may be difficult to access the region storing the batteries needing replacement, particularly for persons suffering from afflictions such as arthritis. In addition, replacing the batteries such that the poles of each battery are properly aligned may be difficult, particularly for small children or individuals with poor eyesight who may have trouble reading any visual indications of polarity. In addition, some people may not be familiar with polarity indications and may have trouble determining the proper orientation of the batteries.

SUMMARY OF THE INVENTION

Therefore, a need has arisen for an apparatus that addresses the deficiencies and disadvantages of the prior art. In accordance with the present invention, a battery compartment and method for manufacturing a battery compartment are provided that address disadvantages and problems associated with previously developed battery compartments and manufacturing techniques.

According to one aspect of the invention, a battery contact and holding apparatus includes a door and a battery compartment associated with the door. The door selectively provides access to the interior of the battery compartment. The apparatus also includes a plurality of contacts for electrically coupling to a battery in the battery compartment and a post locator associated with the battery compartment for aligning one or more posts of a battery with one or more of the plurality of contacts and for disallowing the door to close off the interior of the battery compartment if a battery is not properly placed.

According to another aspect of the invention, a method of manufacturing a battery contact and holding apparatus comprises forming a battery compartment having an interior and at least one post locator and providing a plurality of contacts for electrically coupling a battery in the battery compartment. The method also includes forming a door associated with the battery compartment and pivotally coupling the door to the battery compartment. The method further includes forming the at least one post locator with a size and configuration operable to align at least one post of a battery with the plurality of contacts and to disallow the door to close off the interior of the battery compartment if a battery is not properly placed.

The invention provides several technical advantages. For example, the invention provides a battery contact and holding apparatus that facilitates access to a battery for replacement. In addition, a battery contact and holding apparatus according to the teachings of the invention facilitates replacement of batteries by informing the user when the batteries are not properly aligned. Thus, the invention allows for easier access and replacement of batteries in electronic devices.

BRIEF DESCRIPTION OF THE DRAWINGS

A more complete understanding of the invention and its advantages will be apparent from the detailed description taken in conjunction with the accompanying drawings in which:

FIG. 1 is a perspective view of a battery holding and contact apparatus;

FIG. 2 is a perspective view of the apparatus of FIG. 1 with a door in an open position showing orientation of a battery for insertion therein;

FIG. 3 is a perspective view of the door used as part of the apparatus of FIG. 1;

FIG. 4 is another perspective view of the door used with the apparatus of FIG. 1;

FIG. 5 is a perspective view of a battery compartment for forming part of the battery holding apparatus of FIG. 1;

FIG. 6 is another perspective view of the battery compartment used as part of the apparatus of FIG. 1;

DETAILED DESCRIPTION OF THE INVENTION

The preferred embodiments of the present invention and its advantages are best understood by referring to FIGS. 1 through 10 of the drawings, like numerals being used for like and corresponding parts of the various drawings.

Figure 9:
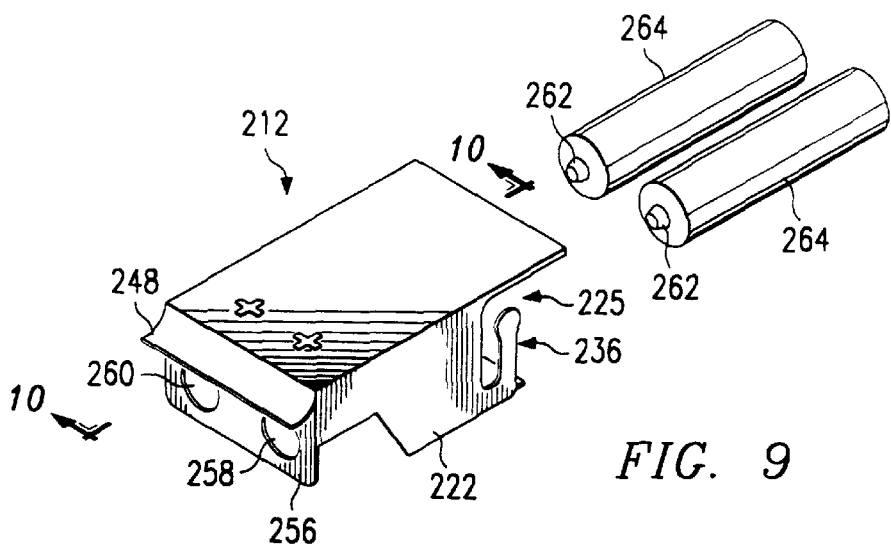
FIG. 9 is a perspective view of a door used as part of another embodiment of a battery holding and contact apparatus.
Figure 10:
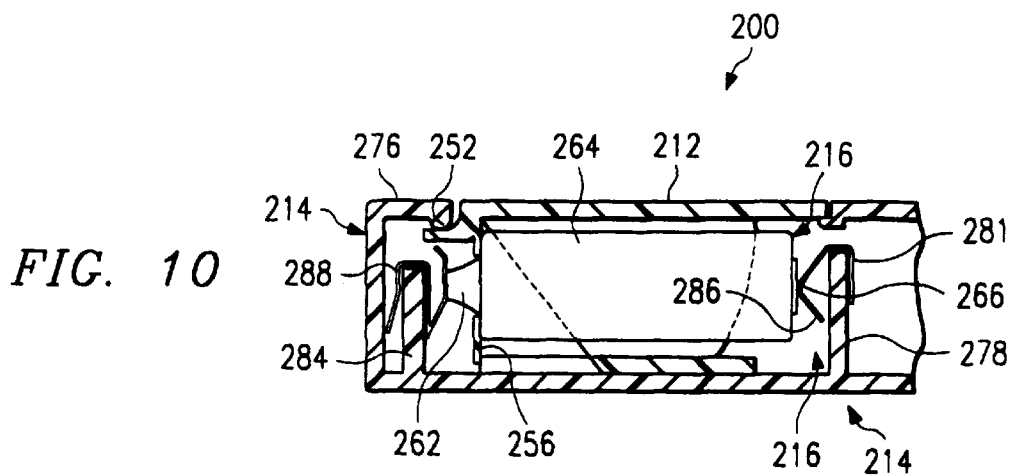
FIG. 10 is a cross-sectional view of the door in FIG. 9, taken along line 10—10 with a battery compartment added.

The present invention involves a battery compartment with a door for holding a battery and providing electrical contact to a device. Any number of battery sizes and types may be used with the present invention. For illustrative purposes, FIGS. 1 through 8 present a battery holding and contact apparatus 10 sized and configured for a standard 9 volt battery, and FIGS. 9 and 10 present an alternative embodiment of a battery holding and contact apparatus 200, sized and configured to accommodate standard AA batteries.

FIG. 1 is a perspective view of a battery holding and contact apparatus 10 according to the teachings of the invention. Battery holding and contact apparatus 10 includes a door 12 and a battery compartment 14. Door 12 is designed to provide selective access to an interior compartment 16 (FIG. 5) of battery compartment 14.

FIGS. 3 and 4 are perspective views of door 12, showing additional details of the door. As best shown by FIGS. 3 and 4, door 12 has a cover 18, a first side wall 20, a second side wall 22, and a third side wall 24. Cover 18 and side walls 20, 22, and 24 form a battery receiving cavity 25 illustrated in FIG. 4. Cover 18 and side walls 20, 22, and 24 guide a battery during placement into battery receiving cavity 25. Cover 18 may extend in length a greater distance than side walls 20, 22, and 24.

As best shown in FIG. 3, first side wall 20 may be formed with an angular guide edge 26 and an angled surface or edge 28. Similarly, second side wall 22 may be formed with an angular guide edge 30 shown in FIG. 3. Angular guide edge 30 may be formed as part of an elongated latching tab 32. Elongated latching tab 32 may be formed by cutting or removing material to form a notch 35 in second side wall 22.

Elongated latching tab 32 also may be formed with an enlarged portion 33. Second side wall 22 may also have an angled surface or edge 34. Elongated latching tab 32 may be one embodiment of a latching mechanism 36 used to hold door 12 closed with respect to battery compartment 14. A number of other suitable techniques may be used for latching mechanism 36, such as a screw or other fastener. As is described further below, a notch 38 may be formed on third side wall 24 to facilitate temporary movement of first side wall 20 and second side wall 22 towards each other to allow door 12 to be installed into battery compartment 14 during assembly. Third side wall 24 may extend slightly beyond angular guide edges 26 and 30 to form stops 40 and 42.

Cover 18 may have an interior surface 54. Extending from a portion of interior surface 54 proximate a second end 46 is a post locator 56. For the embodiment shown, post locator 56 has a first cutout 58 and a second cutout 60. First cutout 58 is sized to receive a positive contact post 62 (FIG. 2) of a nine volt battery 64. Similarly, second cutout 60 is sized to receive a negative contact post 66 of battery 64.

Figure 8:
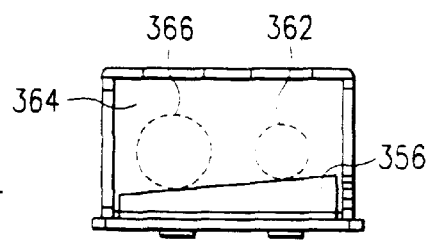
FIG. 8 is a transverse cross-sectional view of the battery holding and contact apparatus shown in FIG. 1, showing an alternative post locator.

Post locator 56 may take other shapes as well; for example, as shown in FIG. 8, it may be a simple ledge 356 sized and located so that the larger diameter of two contact posts 366 and 362 of a nine volt battery 364, which is negative contact post 366, will contact ledge 356 if battery 364 is improperly placed in the compartment.

As shown in FIG. 4, cover 18 has a first end 44 and second end 46. Proximate second end 46 a hinge lip 48 may be formed. Hinge lip 48 may extend substantially the distance of a first edge 50 of cover 18. Hinge lip 48 may be a slightly rounded extension for mating with a hinge edge 52 (FIG. 5) as explained further below.

FIG. 2 is a perspective view of battery holding and contact apparatus 10 with door 12 in an open position, showing orientation of battery 64 for insertion therein. FIGS. 5 and 6 are perspective views of battery compartment 14. Referring now to FIGS. 2, 5, and 6, battery compartment 14 is shown having a first side wall 68, a second side wall 70, and a third side wall 72. A surface ledge or flange 74 may be formed along an edge of side walls 68, 70, and 72. Surface ledge or flange 74 may be formed with an access cavity 75 and with a sealing ledge 77. Access cavity 75 may facilitate opening of door 12. Sealing ledge 77 may have an enlarged portion 79. Extending from surface ledge or flange 74 near a first end 76 of battery compartment 14 is a biasing stop 78. Biasing stop 78 may include a bend 80. Extending from surface ledge or flange 74 proximate a second end 82 of battery compartment 14 is a clip tab 84.

Side walls 68, 70, and 72 along with biasing stop 78 and clip tab 84 form the interior compartment 16 substantially closed on five surfaces. Door 12 is used to close interior compartment 16, i.e., the sixth side. Contact clips 86 and 88 may be placed on clip tab 84 to provide an electrical contact with contact posts 62 and 66 of battery 64 when inserted into interior compartment 16.

As shown in FIG. 1, appropriate wiring 90 may be attached to contact clips 86 and 88 to provide electrical power to a device (not shown). Contact clips 86 and 88 may be formed of a material that conducts electricity while providing resistance to deformation so as to bias the battery away from contact clips 86 and 88. In particular, as shown in FIG. 2, a portion 92 of contact clip 88 will contact negative contact post 66 of battery 64 while also serving as a spring to push battery 64 away from contact clip 88.

An analogous portion (not explicitly shown) of contact clip 86 may also be formed to contact positive contact post 62 of battery 64 and also urge battery 64 away from contact clip 86. At the opposite end of battery 64 when inserted into interior compartment 16, is biasing stop 78. Biasing stop 78 is formed to provide a bias towards contact clips 86 and 88. The combined effect of contact clips 86, 88 and biasing stop 78 is to securely hold battery 64 in interior compartment 16. An angled portion 94 of biasing stop 78 may also help direct battery 64 into interior compartment 16. Bend 80, which is illustrated between angled portion 94 and a flat portion 96 of biasing stop 78, helps guide and bias battery 64 toward interior compartment 16.

Figure 7:
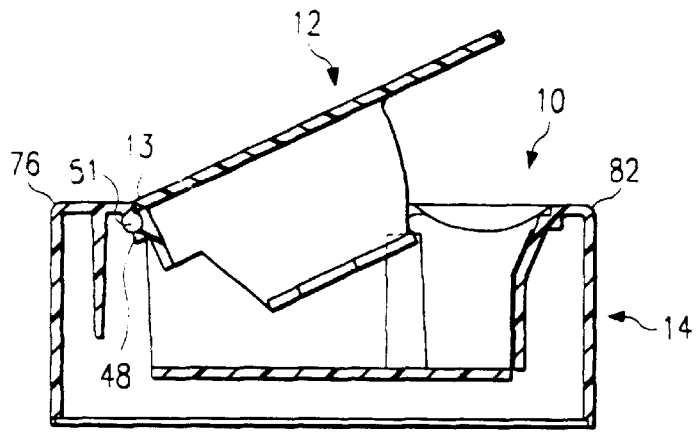
FIG. 7 is a cross-sectional view of the battery holding and contact apparatus of FIG. 1 showing additional details of the operation of the door used as part of the apparatus.

As shown in FIG. 5, first side wall 68 may have a tool cutout 98. Similarly, second side wall 70 may have a tool cutout 100. An interior portion of surface ledge or flange 74 proximate second end 82 may be formed with hinge edge 52 (FIG. 5) suitable for mating with hinge lip 48. Also, sealing ledge 77 near hinge edge 52 is used to support a portion of cover 18, e.g., corners 13 (FIGS. 2 and 7) to help support door 12 when in an open position. FIG. 7 is a cross-sectional view of battery holding and contact apparatus 10 showing additional details of the operation of door 12. As shown, hinge lip 48 may contact and pivot about the top of hinge edge 52 so that door 12 does not slide into interior compartment 16 when door 12 is in an open position.

Door 12 may be formed as an integral piece through injection molding. Any number of materials may be used to form door 12, including for example, ABS plastic. Similarly, battery compartment 14 may be formed of a single integral piece through an injection molding process. In this regard, tool cutouts 98 and 100 provide tool access such that stops 102 and 104 may be formed on a portion of side walls 68 and 70, respectively.

Once formed, door 12 may be installed in battery compartment 14 by first placing hinge lip 48 against hinge edge 52 and then providing a force on the exterior of side walls 20 and 22 to deflect side walls 20 and 22 inwardly, allowing stops 40 and 42 to bypass stops 102 and 104.

In operation, once assembled, door 12 is allowed to pivot about hinge lip 48 and hinge edge 52. The extent of pivot or rotation of door 12 is limited at one extreme by contact of stops 40 and 42 with stops 102 and 104. At the other extreme, door 12 is placed in a completely closed position with a portion of cover 18 in contact with sealing ledge 77. To selectively hold door 12 in a closed position, just prior to being completely closed, enlarged portion 33 of elongated latching tab 32 comes into contact with stop 104. To temporarily lock door 12 in place, additional force is placed on the exterior of door 12 such that elongated latching tab 32 deflects towards notch 35, allowing enlarged portion 33 to bypass stop 104. Upon bypassing stop 104, enlarged portion 33 and elongated latching tab 32 return to their normal position holding door 12 closed. The rounded or bulb portion of the enlarged portion 33 illustrated in FIG. 3 holds door 12 secure.

When it is desired to open door 12, a person may place a device or a finger into access cavity 75 so as to catch a portion of the first end 44 of door 12 to apply force that causes the rounded enlarged portion 33 and elongated latching tab 32 to deflect bypass stop 104, allowing door 12 to open. Once opened, battery 64 may be oriented as shown in FIG. 2 and slid into battery receiving cavity 25. If contact posts 62 and 66 of battery 64 are properly aligned, contact posts 62 and 66 will mate properly with cutouts 58 and 60 of post locators 56. The correct orientation of battery 64 is shown in FIG. 2.

If battery 64 is not in the correct orientation, contact posts 62 and 66 will not bypass cutouts 58 and 60, and when a person attempts to close door 12, the fact that contact posts 62 and 66 have not mated with cutouts 58 and 60 causes a first portion 65 of battery 64 to interfere or contact sealing ledge 77 proximate first end 76 of battery compartment 14. Thus, the design of battery holding and contact apparatus 10 dictates proper orientation of battery 64 before door 12 may be closed. The embodiment shown in FIGS. 1 through 6 does not require snaps to be placed on this nine volt battery, but rather uses clip contacts 86 and 88.

Referring now to FIGS. 9 and 10, an alternative embodiment is shown. FIG. 9 is prospective view of a door 212 used as a part of another embodiment of a battery holding and contact apparatus 200. FIG. 10 is a cross-sectional view of door 212 with a battery compartment 214. Battery holding and contact apparatus 200 is shown having door 212 and battery compartment 214. Door 212 is formed in a manner analogous in most respects to door 12 of FIGS. 1 through 6, but a battery receiving cavity 225 is sized to accommodate AA batteries 264, shown in FIG. 9. As with battery holding and contact apparatus 10, a plurality of walls, such as a side wall 222, form the battery receiving cavity 225. A post locator 256 has a first cutout 258 and a second cutout 260. In this instance, cutouts 258 and 260 are each sized the same to accommodate contact posts 262 of batteries 264. A hinge lip 248, a locking mechanism 236, and other battery holding and contact apparatus 200 are analogous to corresponding features of apparatus 10.

Referring now to FIG. 10, a cross-section showing door 212 in cooperation with battery compartment 214 is shown. Battery compartment 214 is formed in an analogous manner to that of battery compartment 14 of FIGS. 1 through 6; however, one difference between battery compartments 14 and 214 is that biasing stop 78 is replaced by a biasing stop composed of a tab 278 with a contact spring 281. Contact spring 281 provides electrical contact to a negative contact posts 266 on battery 264 and also urges battery 264 towards a center portion of an interior compartment 216. Other features, such as hinge edge 252 and clip tab 284 with contact clip 288 are substantially the same as associated features of apparatus 10. It will be appreciated that with the embodiment of FIGS. 9 through 10, the positive contact posts 262 of the batteries 264 are both placed toward a first end 276 of compartment 214. Consequently, an electrical contact may be provided between a first contact clip 288 and a second contact spring 281 to place batteries 264 in series.

Although the present invention and its advantages have been described in detail, it should be understood that various changes, substitutions, and alterations can be made therein without departing from the spirit and scope of the invention as defined by the appended claims. For example, post locators 56 may be formed as an integral part of door 12 or battery compartment 14.

What is claimed is:

1. A battery contact and holding apparatus comprising:
    a door;
    a hinging mechanism coupled to the door;
    a battery compartment, the door pivotally coupled by the hinging mechanism to the battery compartment to selectively provide access to an interior of the battery compartment;
    first and second contacts for electrically coupling to a battery in the battery compartment, the first and second contacts coupled to the battery compartment;
    a post locator associated with the battery compartment and comprising an inclined ledge that extends across at least a portion of the battery compartment for aligning first and second posts of the battery with the first and second contacts and for preventing the door to close off the interior of the battery compartment if the battery is not properly placed such that the first post is aligned with the first contact and the second post is aligned with the second contact.

2. The apparatus of claim 1 wherein the door comprises a battery-holding door having a cover, a first side wall, a second side wall, and a third side wall, the cover and side walls coupled together to form a battery-receiving housing.

3. The apparatus of claim 2 wherein the third side wall is formed with a notch therein operable to facilitate flexing of the first and second side walls for installing in the battery compartment.

4. The apparatus of claim 1 wherein the hinging mechanism comprises:
    a hinge lip formed on the door; and
    a hinge edge formed on the battery compartment for receiving the hinge lip and allowing limited rotation of the hinge lip about the hinge edge.

5. The apparatus of claim 1 wherein the post locator is coupled to the door.

6. The apparatus of claim 1 wherein the post locator is coupled to the battery compartment.

7. The apparatus of claim 1 further comprising a latch mechanism formed on the door.

8. The apparatus of claim 7 wherein the latch mechanism comprises an elongated latching tab formed on the door.

9. The apparatus of claim 1 further comprising an access cavity formed in the battery compartment for facilitating opening of the door.

10. A battery contact and holding apparatus comprising:
    a door comprising a concave hinge lip extending substantially across the door;
    a battery compartment comprising a hinge edge extending substantially across the battery compartment, the hinge lip being pivotally coupled to the hinge edge between the hinge edge and an interior of the battery compartment for selectively providing access to the interior of the battery compartment when the hinge lip is selectively pivoted about the hinge edge;
    a plurality of contacts for electrically coupling to a battery in the battery compartment; and
    a post locator associated with the battery compartment for aligning one or more posts of the battery with one or more of the plurality of contacts and for disallowing the door to close off the interior of the battery compartment if the battery is not properly placed.

11. The apparatus of claim 10 wherein the post locator is formed with first and second apertures or cutouts, the first aperture or cutout having a size and configuration such that the first aperture or cutout is operable to receive a negative contact of a nine volt battery, the second aperture or cutout having a size and configuration such that the second aperture or cutout is operable to receive a positive contact of a nine volt battery but is not operable to receive a negative contact of a nine volt battery.

12. The apparatus of claim 10 wherein the post locator comprises an inclined ledge extending substantially across the battery compartment for aligning a first positive post with a first contact and for aligning a second negative post with a second contact, the ledge defining a first region adapted to receive the first positive post and a second region adapted to receive the second negative post, the first region being narrower than the second region and too narrow to receive the second negative post, the ledge preventing the door from closing off the interior of the battery compartment if the battery is not properly placed such that the first positive post is aligned with the first contact and the second negative post is aligned with the second contact.

13. The apparatus of claim 10 wherein the post locator comprises a means for aligning one or more posts of a battery with one or more of the plurality of contacts and for disallowing the door to close off the interior of the battery compartment if a battery is not properly placed.

14. The apparatus of claim 10 wherein the post locator is formed with an aperture or cutout, the aperture or cutout having a size and configuration such that the aperture or cutout is operable to receive a first post of a battery, the first post having a first polarity, the aperture or cutout also having a size and configuration such that the aperture or cutout in not operable to receive a second post of the battery, the second post having a second polarity, the first polarity different from the second polarity.

15. The apparatus of claim 14 wherein the post locator is formed with an aperture, the aperture having a size and configuration such that the aperture is operable to receive a positive post of a AA battery but not operable to receive a negative post of a AA battery.

16. The apparatus of claim 14 wherein the post locator is formed with an aperture, the aperture having a size and configuration such that the aperture is operable to receive a positive post of a AAA battery but not operable to receive a negative post of a AAA battery.

17. A battery contact and holding apparatus comprising:
a battery holding means for holding a battery;
a selective access means for selectively providing access to an interior of the battery holding means, the selective access means having a closed position and an open position, the selective access means comprising a concave hinge lip and a hinge edge that each extend substantially across the battery holding means, the hinge lip being pivotally coupled to the hinge edge between the hinge edge and the interior of the battery holding means to provide access to the interior of the battery holding means when the hinge lip is selectively pivoted about the hinge edge to place the selective access means in the open position;
a contact means comprising first and second contacts for electrically coupling to a battery in the battery holding means, the contact means coupled to the battery holding means; and
a means for aligning first and second posts of the battery with the first and second contacts, respectively, of the contact means and for disallowing closing of the selective access means if a battery is not properly aligned, the means for aligning comprising an inclined ledge extending across a substantial portion of the battery holding means and defining a first region adapted to receive the first post and a second region adapted to receive the second post, the first region being narrower than the second region and too narrow to receive the second post.

* * * * *